United States Patent [19]

O'Keefe

[11] Patent Number: 5,411,216
[45] Date of Patent: May 2, 1995

[54] TIRE SHREDDER AND PROCESS FOR SHREDDING TIRES

[76] Inventor: Dennis O'Keefe, W275 S3240 Burnell Dr., Waukesha, Wis. 53188

[21] Appl. No.: 989,259

[22] Filed: Dec. 11, 1992

[51] Int. Cl.$^6$ .............................................. B02C 19/12
[52] U.S. Cl. .................................... 241/24; 241/29; 241/79.1; 241/157; 241/261.2; 241/297; 241/DIG. 31
[58] Field of Search ................ 241/24, 29, 152.2, 157, 241/297, DIG. 38, DIG. 31, 79.1, 261.2, 261.3, 236

[56] References Cited

U.S. PATENT DOCUMENTS

| | | | |
|---|---|---|---|
| 1,181,967 | 5/1916 | Curtis et al. | 241/157 |
| 2,968,444 | 1/1961 | Jones | 241/297 |
| 3,273,807 | 9/1966 | Wright | 241/157 |
| 3,923,256 | 12/1975 | Dörner | 241/76 |
| 4,025,990 | 5/1975 | Lovette, Jr. | 241/14 |
| 4,374,573 | 2/1983 | Rouse et al. | 241/101.7 |
| 4,383,650 | 5/1983 | Contal et al. | 241/66 |
| 4,426,044 | 1/1984 | Butler | 241/236 |
| 4,519,550 | 5/1985 | Rouse | 241/167 |
| 4,560,112 | 12/1985 | Rouse et al. | 241/236 |
| 4,690,340 | 9/1987 | Hatanaka | 241/236 |
| 4,714,201 | 12/1987 | Rouse et al. | 241/24 |
| 4,726,530 | 2/1988 | Miller et al. | 241/24 |
| 4,813,614 | 3/1989 | Moore et al. | 241/23 |
| 4,927,088 | 5/1990 | Brewer | 241/223 |
| 4,944,462 | 7/1990 | Raterman et al. | 241/100 |
| 5,048,764 | 9/1991 | Flament | 241/36 |
| 5,169,078 | 12/1992 | Lamar | 241/222 |
| 5,299,744 | 4/1994 | Garmater | 241/19 |

FOREIGN PATENT DOCUMENTS 145676 10/1903 Germany .............................. 241/297
6315 of 1910 United Kingdom ................ 241/297

Primary Examiner—John Husar
Attorney, Agent, or Firm—Wheeler & Kromholz

[57] ABSTRACT

Shredding machines and a process for recycling used vehicular tires comprising a primary shredder and process, a secondary shredder and process, a granulator and a first process, a material separating means and process, and a granulator and a second process. The primary shredder having parallel counter rotating shafts to which a plurality of cylindrical spur gear-shaped cutters with teeth are attached at proportional distances. The shafts are positioned relative to one another such that a cutter attached to the first shaft fits in the proportional space between two identical cutters on the second shaft. The edges of the top lands and bottom lands of each cutter tooth perform the cutting operation. Thus the power requirement of the primary shredder can be reduced by nearly 90%. The secondary shredder having a reel-type cutter known in the art. The granulator comprising an improved grinding machine with mating grinding discs with working surfaces separated by a controlled gap. A magnetic conveyor and shaker conveyor separate the metal wires and polyester fibers from the rubber particles. Finally, the rubber is processed in the granulator a second time with a reduced controlled gap between the working surfaces of the mating grinding discs. All of the aforementioned machines also comprise components of a corresponding rubber recycling process in which the rubber may be reused as fuel in a power producing plant, as an additive in the manufacture of asphalt, or any other desired use.

24 Claims, 6 Drawing Sheets

TIRE SHREDDER AND PROCESS FOR SHREDDING TIRES

BACKGROUND OF THE INVENTION

Used vehicular tires are difficult to dispose of because they occupy a vast amount of space in a landfill or other disposal area and disintegrate at a much slower rate than other refuse. Most landfills charge high fees for used tire disposal and some landfills will not even accept them. Alternatively, they cannot be efficiently burned in an energy conversion process or otherwise recycled in their present form. However, when used fires are reduced to rubber strips of a smaller size, e.g. ½"×2" (1.27 cm×5.08 cm), they can be used as fuel in power producing plants. If the strips are further reduced to a fine granular powder, the powder can be used as an additive in the manufacture of asphalt as well as other uses, e.g. rubber mats, etc. Federal law and regulations currently mandate that by 1994 a specified amount of recycled rubber be added to all new asphalt. Thus it has become very desirable to recycle used tires to keep them out of landfills while utilizing them for the production of energy or for the manufacture of asphalt and other suitable compounds or mixtures. There are machines and processes currently on the market which perform these recycling functions; however, none do so in the same novel, effective, and efficient way as this tire shredder and process.

The primary shredder of this tire shredding mechanism cuts the tires at the line to line interface of the edge of the bottom land of the first rotary cutter tooth and the edge of the top land of the second cutter tooth. Unlike the prior art, which cuts the tires in a scissor-like manner along the side edges of each tooth, the primary shredder requires approximately 90% less horsepower to achieve the same results. The unique and novel design of the tire pulverizing or grinding machine efficiently reduces the rubber while separating the metal wire and polyester fibers from the recycled rubber. Its grinding disks are designed and the speed of their rotation is set so that the rubber pieces are not burned as they are processed. Thus the invention produces unburned recycled rubber which does not contain metal wires or fibers commonly used in the construction of vehicular tires.

SUMMARY OF THE INVENTION

The invention consists of two machines and one process for recycling used vehicular tires into small rubber pieces or rubber powder for use in the production of energy, the manufacture of asphalt respectively, or other use.

The first machine of the invention, the tire shredding mechanism, contains a primary and secondary shredder. The primary shredder consists of two counter rotating shafts that rotate on parallel axes. Each shaft contains a series of cylindrical cutters. Cutting teeth are proportionally spaced around the circumference of each cylindrical cutter. The cylindrical cutters are spaced at proportional distances on the rotating shafts such that a cylindrical cutter on the first shaft rotates within a space between two identical cylindrical cutters on the second shaft. Spacers occupy the proportional spaces on the two shafts not occupied by cylindrical cutters.

Each cutter tooth has a top land, a bottom land, a tooth thickness, and a space width similar to a spur gear tooth. Unlike a spur gear tooth, the space width is less than the tooth thickness. The shape of the cutter tooth may vary. For example, the tooth may have an involute shape. The distance between the top and bottom land is less than standard cutters having a similar configuration. The edges of each cutter tooth's top land and bottom land perform the cutting operation. The edges of the cutter teeth on a cylindrical cutter are within line to line contact of the edges of the cutter teeth on the neighboring cylindrical cutter on the opposite shaft and their outer peripheries overlap. Accordingly, the parallel shafts are spaced such that the top land of the first cutter tooth passes just below the bottom land of the space in the second cylindrical cutter during the cutters' rotation.

As a tire is placed between the proportionately spaced counter rotating cylindrical cutters, it is drawn in between the cutters by the teeth and spaces on each cylindrical cutter. The tire is not cut until an edge of the first cutter's top land cuts through the tire as it rotates across the corresponding edge of the bottom land of the second cutter's space. Then the following tooth on the second cutter takes over on the same plane and continues the cut as it overlaps with the following space on the first cutter. Finally the whole tire is pulled through the primary shredder and cut into approximately 2"×12" (5.08 cm×30.48 cm) strips of rubber.

This unique and novel cutting technique requires approximately 90% less horsepower than is necessary for a conventional tire shredder. Thus the primary shredder can be powered by a much smaller motor and less energy will be consumed during the first shredding process.

Within the same machine, the strips are removed from the primary shredder by stripping fingers and fed into a secondary shredder located beneath the primary shredder. The first ends of the stripping fingers are attached to the frame of the machine and the second ends extend into the spaces between the cylindrical cutters. The secondary shredder may utilize a standard reel-type cutting mechanism or a cutter that is similar to the primary. The secondary shredder further reduces the rubber strips to ½"×2" (1.27 cm×5.04 cm) pieces. The resulting smaller pieces are now of a size sufficient for use as fuel in a power producing plant. However, if the rubber is to be used as an additive to other compounds, mixtures, or substances, additional machines and a continuation of the recycling process are required.

For use as an additive, the rubber pieces must be further reduced to a fine powder with a particle size of about 50–60 thousandths of an inch (0.127–0.152 cm) or smaller. This reduction is accomplished by utilizing the grinding machine equipped with mating grinding discs or pulverizing plates with specific cutting groove configurations. The rotational speed of the pulverizing plates should be limited to approximately 200 surface feet per minute or less (approximately, 50 RPM or less for a substantially circular pulverizing plate having a 16 inch diameter) to prevent the rubber from burning while being processed. The pulverizing plates should be fabricated from high speed steel so that the wire from the steel belts remaining within the rubber pieces can be cut without damaging the plates. Additionally, all the cutting grooves within the pulverizing plates must be machined smooth so that the rubber particles, which act in a somewhat viscous manner, will not cling to the grooves and clog them.

The surface of each plate has a maze-like appearance. Each pulverizing plate contains an identical series of grooves or lowered portions from its center to its outer edge. The walls of the grooves are formed by raised portions within the plate. The height of the raised portions are all equivalent and their top surfaces all lie within the same plane. The remaining recessed elongated channels form the grooves through which the rubber pieces and particles pass as they are ground. The depth of the recession is tapered with the greatest depth at the center of each plate. Moving radially outward toward the edge, the depth of the recession decreases until it is equivalent to the top surface of the raised portions. Also near the outer perimeter of each plate, each groove contains a group of feed grooves which are approximately 0.015" deep by 0.015" wide (0.038 cm by 0.038 cm). The function of the feed grooves is to facilitate the discharge of the ground rubber particles during the second pulverizing process.

One of the pulverizing plates has a feed core aperture in its center through which the rubber chips are fed into the machine by an auger, a hopper, or a similar mechanism. As new material is fed into the machine, the granulated material is forced outward toward the edges of the grinding plates.

The mating plates are separated by a controlled gap. For the first pulverizing process, the controlled gap is set at approximately 0.015" (0.038 cm). Thus as the depths of the recessed grooves decrease, the rubber must be reduced to a smaller and smaller particulate size in order to continue to move radially toward the edges of the disks. As the mating plates rotate in opposite directions, the sides of each groove act as paddles which extract the steel belt wires, extract the polyester material, and cut the rubber pieces in a scissor-like manner. The extracted wires are cut a minimum number of times because most wire used in tire construction is less than 0.015" in diameter. Since the controlled gap is set to 0.015", the wires are initially cut several times at the start of the process in the center, until they are rolled or extracted from the rubber. Then they tend to roll out the controlled gap rather than be cut again. Most pieces are about ¼ to ½" long. The polyester fibers and filaments tend to wad together and remain separated from the rubber particles. As the powdered rubber, wires, and fluff are discharged at the edges of the disks, they are collected and moved to the next processing stage.

The output from the grinding machine, powdered rubber, pieces of wire, and fiber material, is transported along a magnetic conveyor whereby the metal wires are removed. While the magnetic forces attract the wires to the conveyor belt's surface, they have no effect on the rubber and polyester fluff which simply fall off the conveyor at its discharge end. These remaining materials fall onto a shaker conveyor where they are shaken through screens with apertures of a predetermined size. Both the granulated rubber and some of the polyester fluff fall through the screen apertures. As these remaining materials fall through the apertures and toward the collection bin below, a vacuum is applied which extracts and captures the light fluff not trapped by the screen apertures. Thus, only granulated rubber falls into the collection bin below.

Next, the powdered rubber is again pulverized. The same type machine and plates are used. However, this time the control gap is set at only 0.00 1" (0.00254 cm). This forces the rubber particles to be extruded only through feed grooves located near the outer perimeter of each plate. The final product is "crumb" or powdered rubber capable of being used as an additive in the manufacture of asphalt or other uses.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The invention comprises a series of machines for tire shredding and a corresponding process hereinafter referred to as 10.

Figure 1:
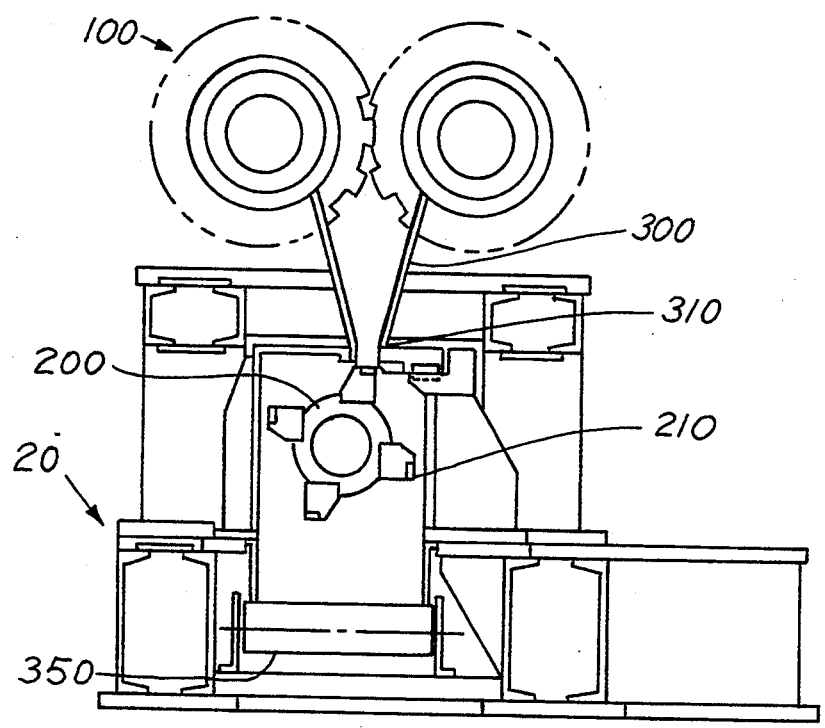
FIG. 1 is a left side view of the shredding machine.
Figure 2:
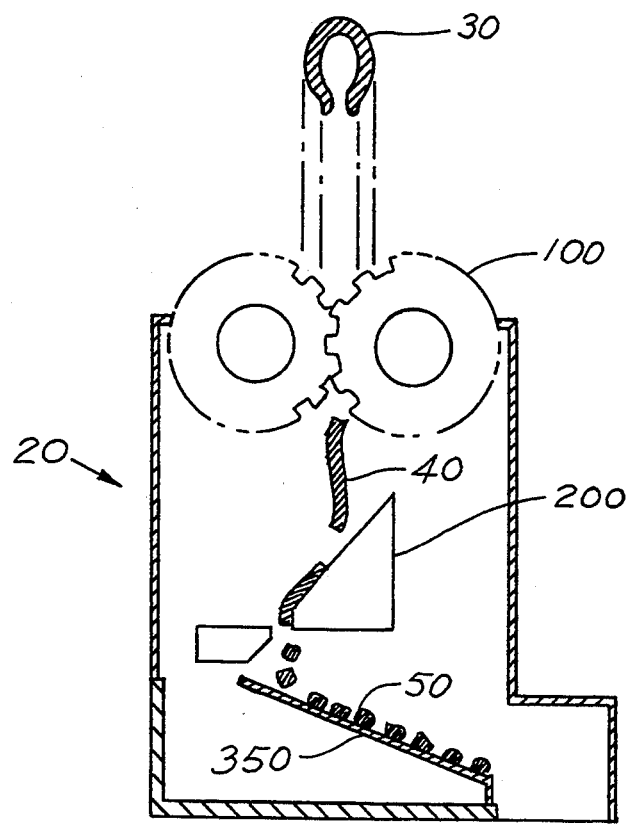
FIG. 2 is a cross-sectional left side view of the shredding machine showing a tire, rubber strips, and rubber pieces.
Figure 3:
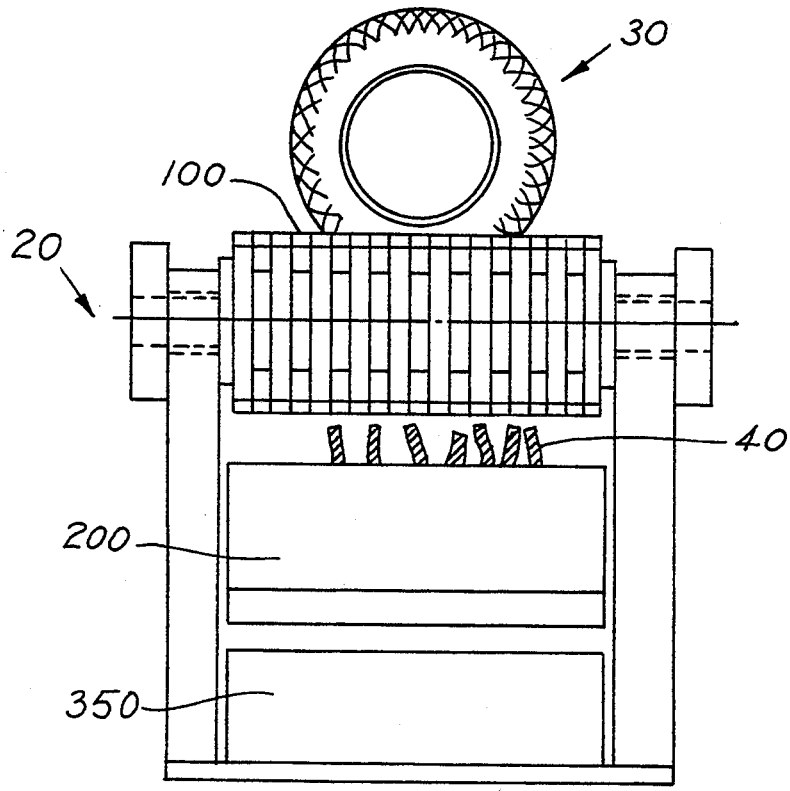
FIG. 3 is a front view of the shredding machine.

The first machine of the invention is the tire shredding mechanism shown as 20 in FIGS. 1, 2, 3, 8, and 9. It comprises a primary shredder 100, a secondary shredder 200, and a conveyor 350. As shown in FIGS. 2 and 3, a tire 30 is fed into the tire shredding mechanism 20 at the primary shredder 100. The tire is cut into long rectangular strips of rubber 40 of approximately 2"×12" (1.27 cm×30.48 cm) in size which are further reduced to small rectangular pieces of rubber 50 of approximately ½"×2" (1.27 cm×5.04 cm) in size by a secondary shredder 200. Finally the rectangular pieces of rubber 50 are removed from the machine 20 by way of a conveyor 350 shown in FIGS. 1, 2, and 3.

Figure 4:
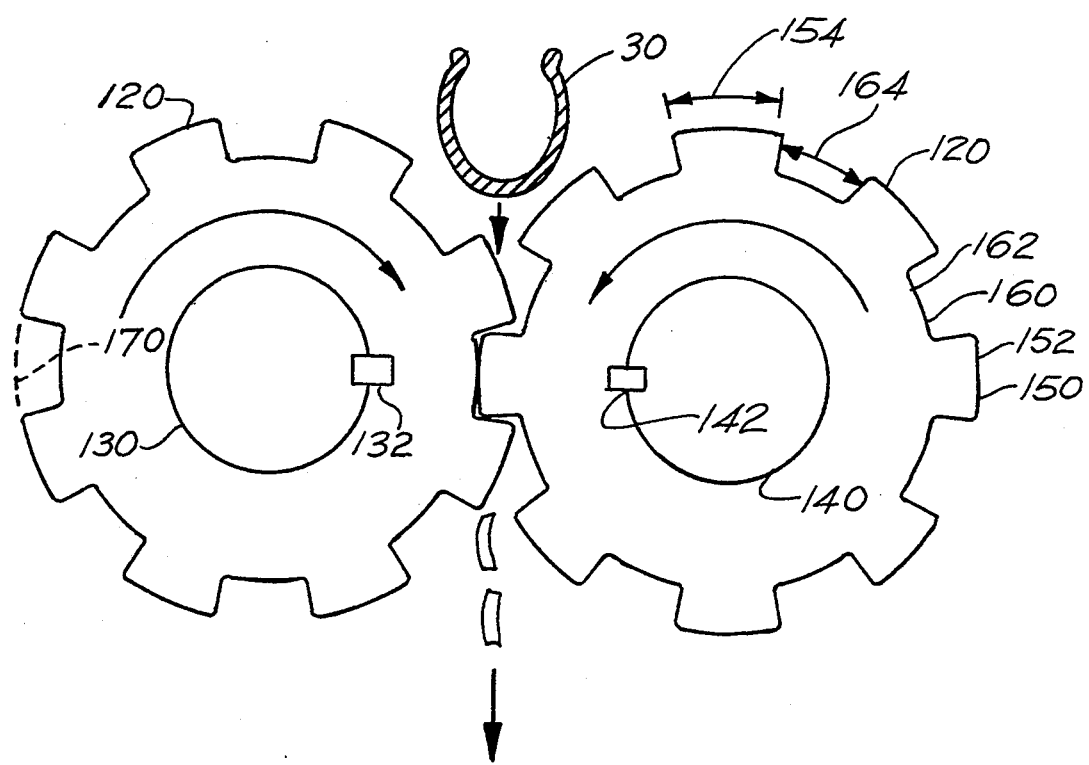
FIG. 4 is a left side view of two cylindrical cutters.
Figure 5:
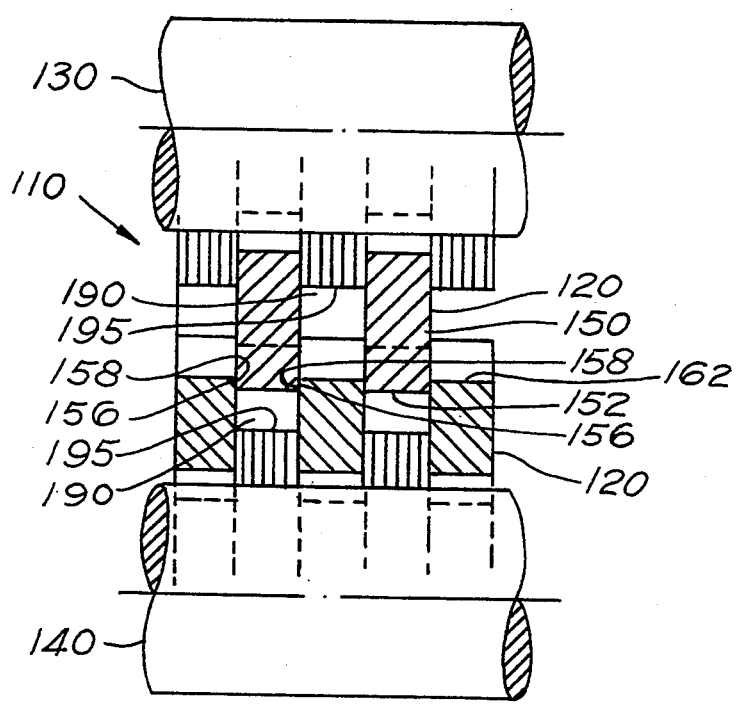
FIG. 5 is a top view of the rotating shafts and a cross-sectional view of the cylindrical cutters.
Figure 8:
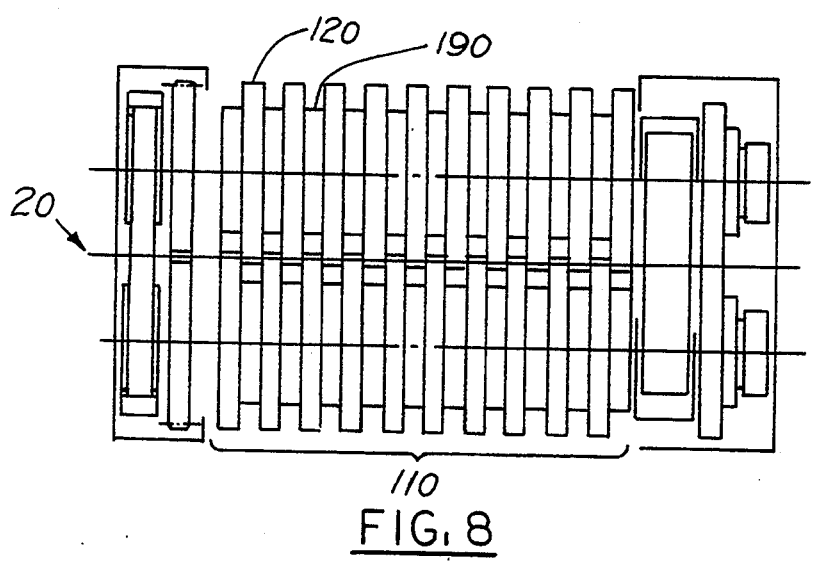
FIG. 8 is a top view of the shredding machine.
Figure 9:
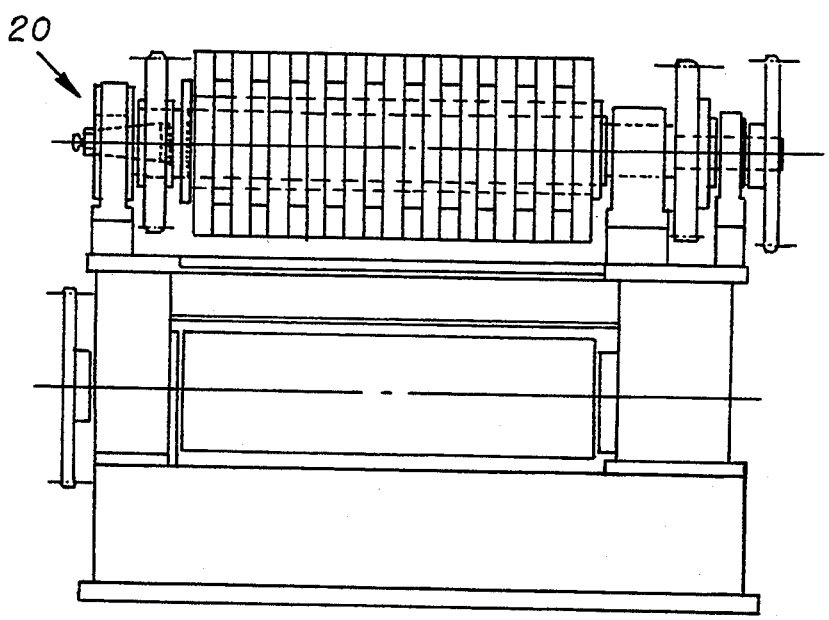
FIG. 9 is a front view of the shredding machine.

The features of primary shredder 100 are shown in detail in FIGS. 4 and 5. In FIG. 4, the tire 30 is fed between counter-rotating cylindrical cutters 120. Cutters 120 are fixedly attached to parallel counter-rotating shafts 130 and 140 by means of a key and key way 132 and 142 respectively. Each shaft, 130 and 140, contains a series 110 of cylindrical spur gear-shaped cutters 120 spaced at proportional distances forming spaces 190 as shown in FIGS. 5 and 8. Each space 190 on shafts 130 and 140 is occupied by a spacer 195. Each cylindrical cutter 120 contains teeth 150 and spaces 160 as shown in FIG. 4. The widths 164 of spaces 160 are less than the thicknesses 154 of teeth 150. The cylindrical cutters 120 are aligned such that the edges 158 of a tooth 150 on shaft 130 rotates within line to line contact of the edges 156 of space 190 located between two identical cutters 120 on shaft 140. The outer peripheries 170 of the series 110 of cutters 120 on shafts 130 and 140 overlap. The parallel counter-rotating shafts 130 and 140 are spaced as shown in FIG. 5 such that the top land 152 of cutter tooth 150 passes just below the bottom land 162 of the neighboring cutter 120 during the cutters' rotation. The edges 158 and 156 of each tooth's top land 152 and bottom land 162 respectively perform the cutting operation.

As a tire 30 is placed between two series 110 of counter-rotating cutters 120, it is drawn between the cutters 120 by teeth 150 and spaces 160 whose relative distances from each other decrease as the two series 110 of cutters 120 continue to rotate in opposite directions on their parallel shafts 130 and 140. The tire 30 is not cut until the edge 158 of cutter tooth 150's top land 152 substantially reaches the 3:00 position. It cuts through the tire 30 as it rotates across the edge 156 of the bottom land 162 of cutter 120's space 190 which is in substantially the 9:00 position. Then the following tooth 150 on cutter 120 takes over on the same plane and continues the cut. Finally the whole tire 30 is pulled through the primary shredder and cut into the approximately 2"×12" (5.08 cm×30.48 cm) strips 40. The rubber strips 40 are removed from the primary shredder 100 by stripping fingers 300 which extend from a fixed location 310 into spaces 190 located between cylindrical cutters 120 as shown in FIG. 1. The stripping fingers 300 also act as a guide to direct the rubber strips 40 into the secondary shredder 200.

The rubber strips 40 are fed into the secondary shredder 200 located beneath the primary shredder 100. Referring again to FIG. 1, the secondary shredder 200 contains a standard reel-type cutting mechanism 210. Alternatively, the secondary shredder can be a cutting mechanism similar to the primary cutter. The reel-type cutting mechanism 210 cuts the rubber strips 40 into the ½"×2" (1.27 cm×5.08 cm) pieces 50. The rubber pieces 50 are shown in FIG. 2 as they are removed by conveyor 350.

Figure 6:
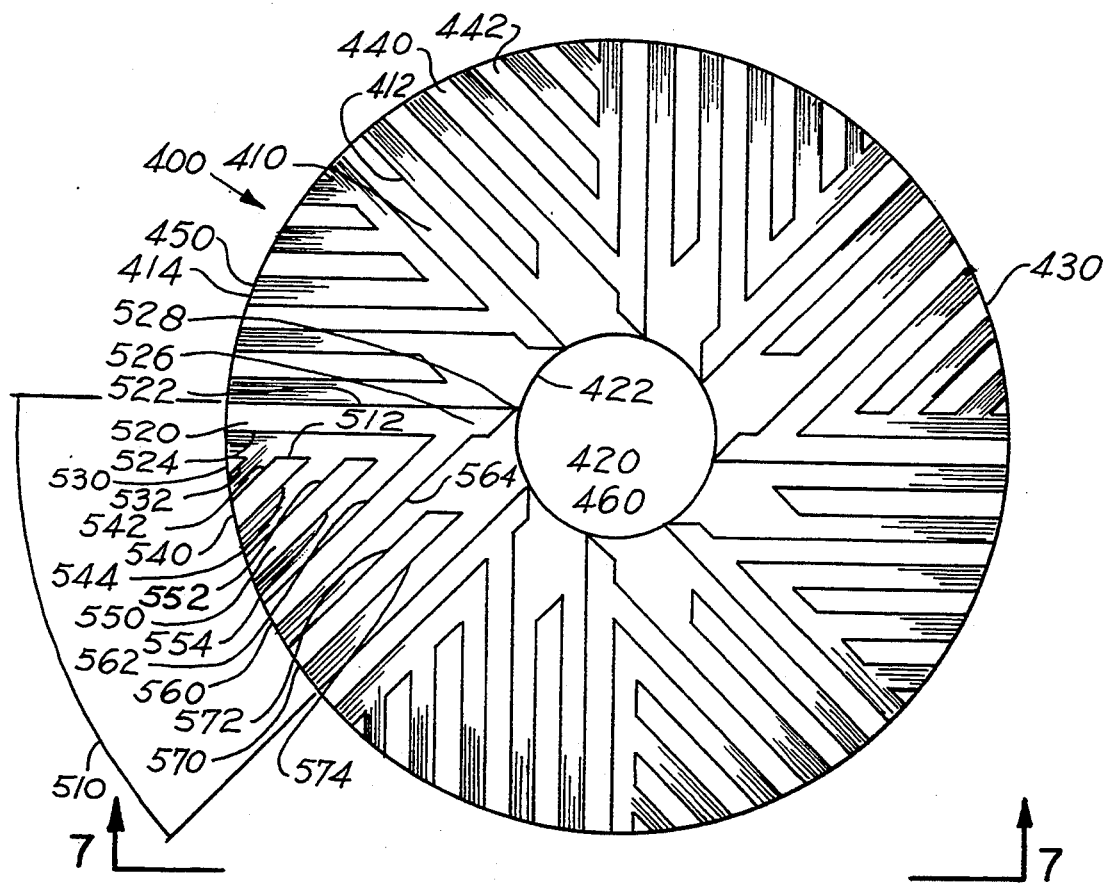
FIG. 6 is a top view of the pulverizing plate.
Figure 11:
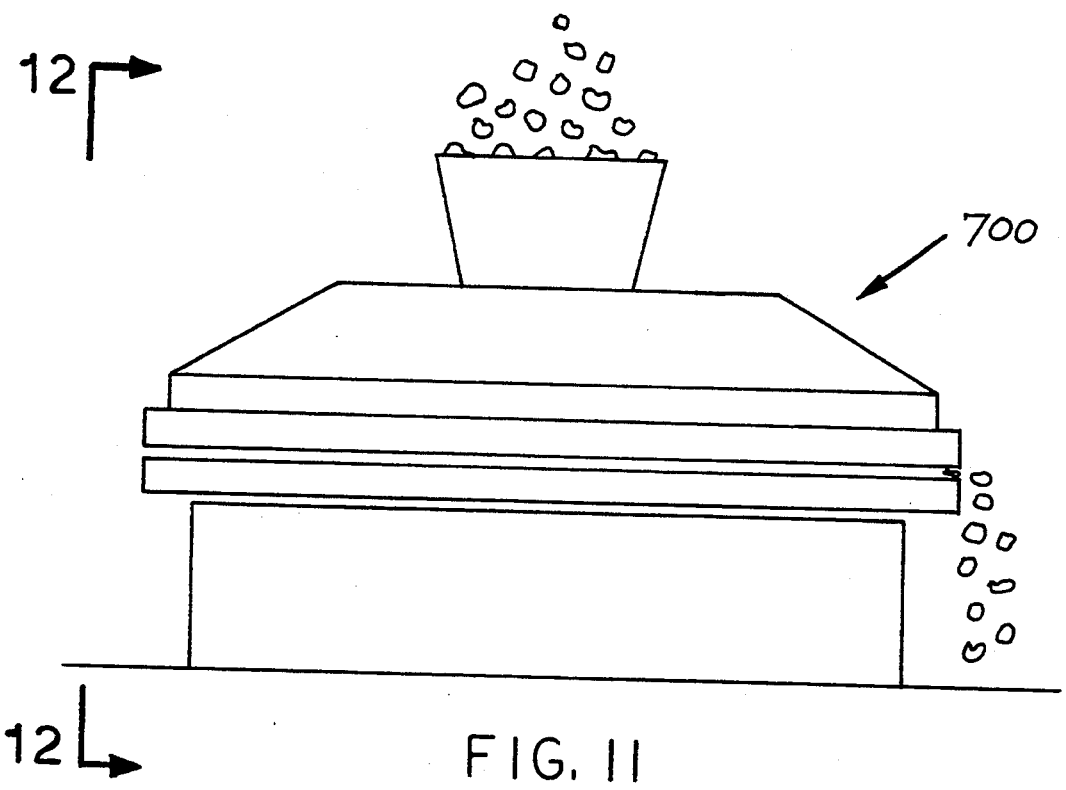
FIG. 11 is a front view of the grinding machine.
Figure 12:
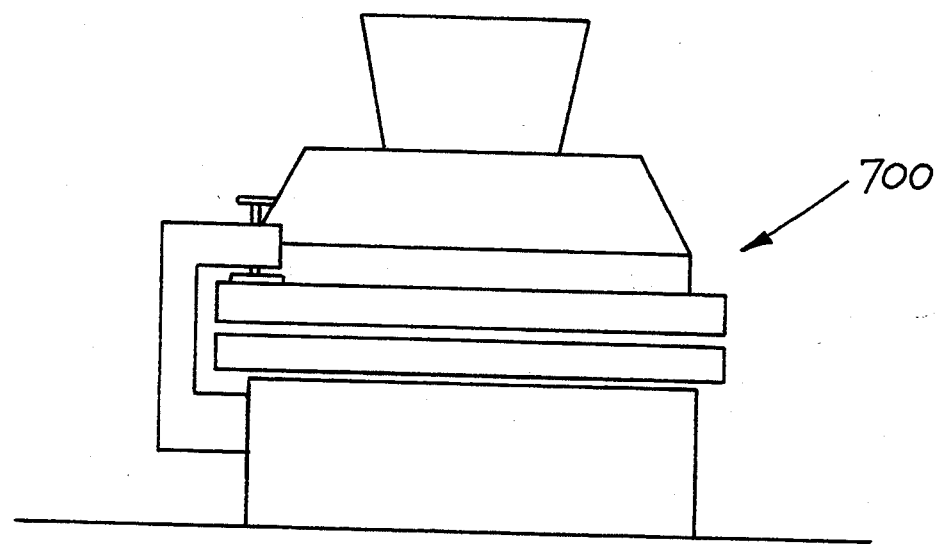
FIG. 12 is a side view of the grinding machine on line 12—12 of FIG. 11.

The next step in the tire recycling process utilizes a grinding machine 700, shown in FIGS. 11 and 12, equipped with mating grinding discs or pulverizing plates 400 and 500 with special cutting grooves 410 as shown in FIG. 6. Pulverizing plate 400 contains a plurality of grooves or lowered portions 410 extending from its center 420 to its outer perimeter 430. The walls of the grooves 412 are formed by raised portions 440. The top surfaces 442 of raised portions 440 all lie in the same plane. The depths of the grooves 410 are tapered with the greatest depth at the center 420 of the plate 400. Moving radially outward toward the outer perimeter 430, the depths of the grooves 410 decrease until they are equivalent to the top surfaces 442 of the raised portions 440. The ends 414 of each groove 410 contain feed grooves 450 approximately 0.015" deep×0.015" wide (0.038 cm by 0.038 cm). The center 420 of pulverizing plate 400 contains a feed core aperture 460 through which the rubber pieces 50 are fed into the grinding machine 700.

As shown in FIG. 6, pulverizing plate 400 is divided into eight equal sections 510. Each section 510 contains raised portions 520, 530, 540, 550, 560, and 570 which form the lowered portions or grooves 410. Raised portion 520 has a point 526 at which trapezoidal raised portion 560 intersects it. Raised portion 530 is the smallest raised portion and has a substantially triangular shape. Raised portions 520, 540, 550, and 570 are trapezoidal in shape and have tapered ends 512. Side 532 of raised portion 530 is parallel to sides 542 and 544 of raised portion 540. Sides 542 and 544 of raised portion 540 are parallel to sides 552 and 554 of raised portion 550. Sides 552 and 554 of raised portion 550 are parallel to sides 562 and 564 of raised portion 560. Sides 562 and 564 of raised portion 560 are parallel to sides 572 and 574 of raised portion 570. Tapered ends 512 of raised portions 540, 550, and 570 are parallel to sides 522 and 524 of raised portion 520. The point 528 where tapered end 512 of raised portion 520 meets side 522 of raised portion 520 tangentially touches the outer perimeter 422 of center 420. Trapezoidal raised portion 570 is longer than trapezoidal raised portion 560 which is longer than trapezoidal raised portion 550 which is longer than trapezoidal raised portion 540.

Figure 7:
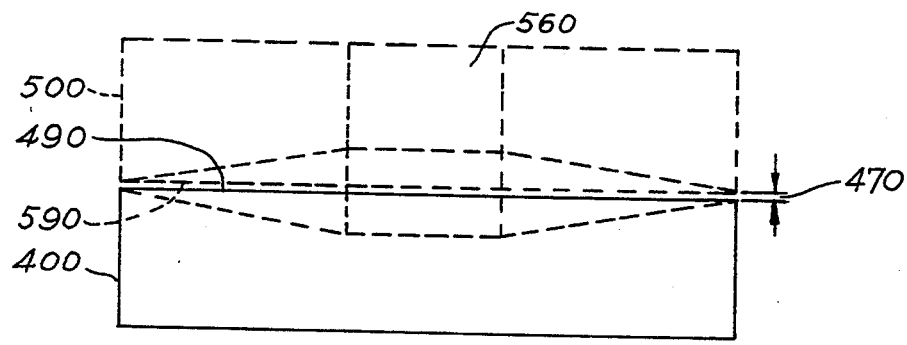
FIG. 7 is a side view of the pulverizing plate on line 7—7 of FIG. 6; the mating pulverizing plate is shown in phantom lines.

FIG. 7 shows the mating pulverizing plates 400 and 500. Pulverizing plate 500 is identical to pulverizing plate 400 except that pulverizing plate 500 contains a feed core aperture 560. The parallel planes of the working surfaces 490 and 590 of mating plates 400 and 500 respectively are separated by a controlled gap 470. During the first pulverizing process this gap is set at approximately 0.015" (0.038 cm). As the mating plates 400 and 500 rotate in opposite directions, the walls 412 of each groove 410 act as knives that cut the rubber pieces 50 in a scissors-like manner and also as paddles that move the finely cut and pulverized rubber material from the feed core aperture 560 to the outside perimeter 430 where it is dispensed and collected. Accordingly, as new rubber pieces 50 are fed into the feed core aperture 560 of pulverizing plate 500, the rubber particles 60 are forced outward toward the outer perimeters 430 of the plates 400 and 500. The output from the first pulverizing process contains ground rubber particles 60, metal wires 62, and fibers 64 as shown in FIG. 10.

Figure 10:
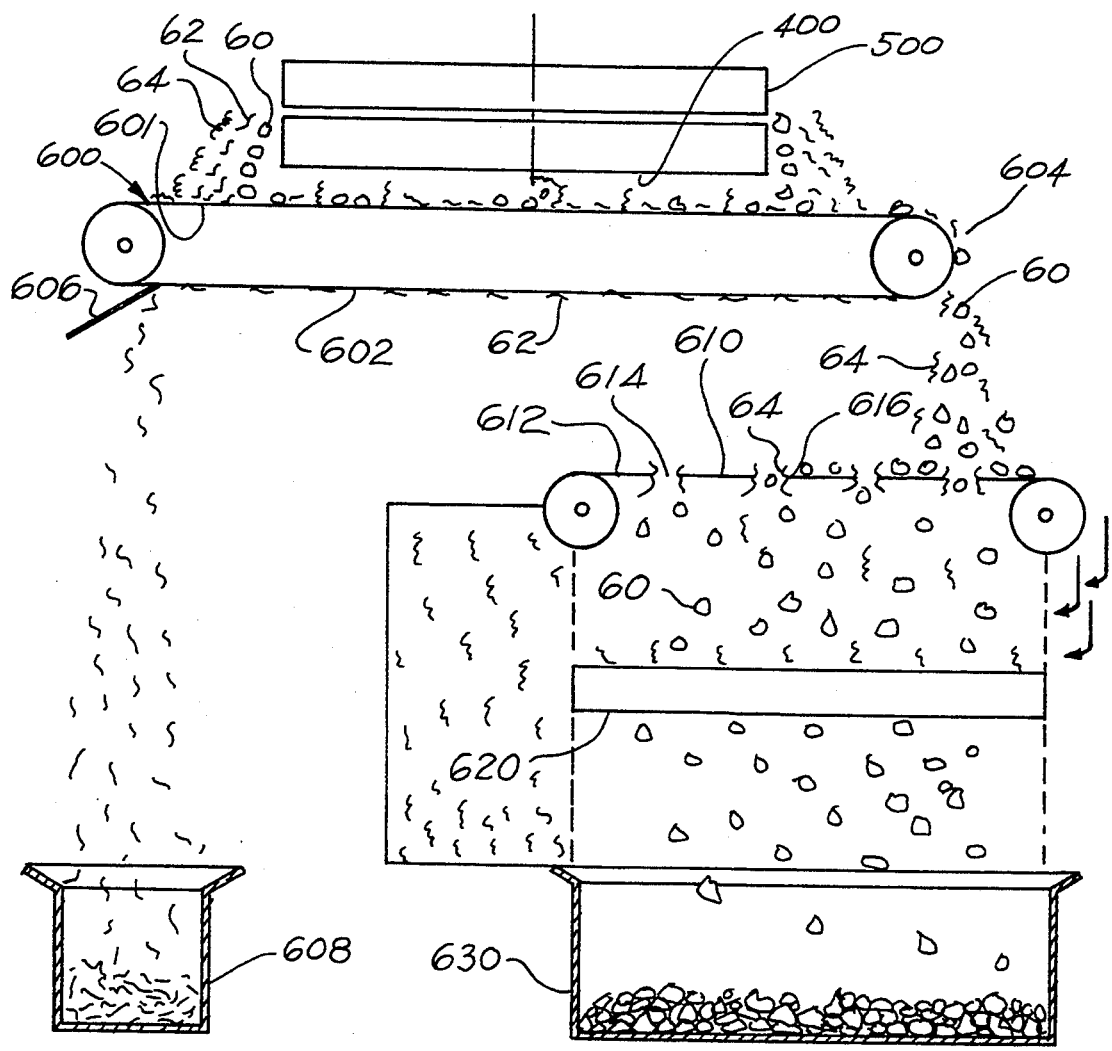
FIG. 10 is a pictorial view of the first grinding process.

The output is moved onto a magnetic conveyor 600 also shown in FIG. 10. The conveyor belt 601 is magnetized and the magnetic forces within the belt's surface 602 attract the metal wires 62. At the conveyor's discharge end 604, only the rubber particles 60 and polyester fibers 64 fall off. The metal wires 62 remain attached to the belt's surface 602 until they are removed by scraper 606 and fall into collection bin 608.

The rubber particles 60 and polyester fibers 64 fall onto a shaker conveyor 610. The materials are shaken through screens 612 with apertures 614 of a predetermined size. While all the rubber particles 60 fall through the apertures 614, most of the polyester fibers 64 are captured by the edges 616 of the screen apertures 614. A vacuum 620 is applied to capture the polyester fibers 64 that do fall through the apertures 614. Thus, only rubber particles 60 fall into the collection bin 630 below.

Finally, the rubber particles 60 are pulverized again in the grinding machine 700 with mating pulverizing disks 400 and 500 with parallel working surfaces 490 and 590 respectively. The machine and process are identical to those aforementioned except that the controlled gap 470 between the pulverizing plates 400 and 500 is reduced to 0.001" (0.00254 cm). Because the controlled gap 470 is so small, the granulated rubber particles 70 are extruded only through the feed grooves 450 on the outer perimeters 430 of the mating plates 400 and 500. The granulated or powdered rubber 70 has a particle size of approximately 50–60 thousandths of an inch (0.127–0.152 cm) or smaller and thus can be used as an additive in the manufacture of asphalt or other materials.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A set of grinding discs for a grinding machine for grinding rubber chips, the set of grinding discs comprising:

a first and a second grinding disc;
each said disc having a first side, a second side, a center, and an outer perimeter;
said first side of each said disc being a working surface;
said first disc having an aperture generally located in said center;
said working surface of said first disc being parallel to and separated by a controlled gap from said working surface of said second disc;
said working surfaces of said first and second discs having raised portions and lowered portions;
said lowered portions having bottom surfaces;
said bottom surfaces being tapered such that their maximum depth is substantially at said center of each said disc, decreasing in depth toward said outer perimeter of each said disc;
each of said working surfaces being divided into a plurality of sections;
each said section having a first, second, third, fourth, fifth, and sixth raised portion;
each said raised portion having a top surface;
each said raised portion extending from said outer perimeter inward;
said first, third, fourth, fifth, and sixth raised portions being generally trapezoidal;
each of said trapezoidal raised portions having two long sides;
said long sides of said third, fourth, fifth, and sixth raised portions being parallel;
said second raised portion being substantially triangular;
said first, third, fourth, and sixth raised portions having a tapered end;
said tapered end of said first raised portion parallel to said long sides of said third, fourth, fifth, and sixth raised portions;
said tapered ends of said third, fourth, and sixth raised portions parallel to said long sides of said first raised portion;
said first raised portion having a point near its tapered end;
said fifth raised portion intersecting said first raised portion at said point;
said sixth raised portion being longer than said fourth raised portion;
said fourth raised portion being longer than said third raised portion.

2. The set of grinding discs of claim 1 in which each of said working surfaces is divided into eight equal sections.

3. An apparatus for pulverizing tires comprising the combination of:

a machine for shredding vehicular tires including:
first and second shafts having central axes;
a plurality of cutters proportionally spaced on said first and second shafts and having proportional spaces located between each said cutter;
each of said plurality of cutters having a plurality of cutting teeth including a top land with a cutting portion and a bottom land with a cutting portion;
each cutter of said first shaft opposing the proportional space on said second shaft and each cutter on said second shaft opposing the proportional space on said first shaft;
said shafts rotating on said central axes in opposite directions;
said cutting portions on said top and bottom lands coming into line to line contact with one another as said shafts rotate;
said cutters drawing said tire in between said cutting teeth and said proportional spaces;
said cutting portions cutting said tire into strips as said top land of each cutting tooth of said plurality of cutting teeth of said plurality of cutters on said first shaft traverses across said bottom land of each cutting tooth of said plurality of cutting teeth of said plurality of cutters on said second shaft;
a set of grinding discs for a grinding machine for grinding rubber chips, the set of grinding discs having:
a first and a second grinding disc;
each said disc having a first side, a second side, a center, and an outer perimeter;
said first side of each said disc being a working surface;
said first disc having an aperture generally located in said center;
said working surface of said first disc being parallel to and separated by a controlled gap from said working surface of said second disc;
said working surfaces of said first and second discs having raised portions and lowered portions;
said lowered portions having bottom surfaces;
said bottom surfaces being tapered such that their maximum depth is substantially at said center of each said disc, decreasing in depth toward said outer perimeter of each said disc;
each of said working surfaces being divided into a plurality of sections;
each said section having a first, second, third, fourth, fifth, and sixth raised portion;
each said raised portion having a top surface;
each said raised portion extending from said outer perimeter inward;
said first, third, fourth, fifth, and sixth raised portions being generally trapezoidal;
each of said trapezoidal raised portions having two long sides;
said long sides of said third, fourth, fifth, and sixth raised portions being parallel;
said second raised portion being substantially triangular;
said first, third, fourth, and sixth raised portions having a tapered end;
said tapered end of said first raised portion parallel to said long sides of said third, fourth, fifth, and sixth raised portions;
said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion.

4. The apparatus of claim 3 in which said plurality of cutters are cylindrical.

5. The apparatus of claim 3 in which each said cutting tooth of said plurality of cutting teeth on said cutters has an involute shape.

6. The apparatus of claim 3 in which a plurality of spacers with outer diameters occupy said proportional spaces on said shafts unoccupied by said plurality of cutters.

7. The apparatus of claim 3 in combination with stripping fingers comprising:

a plurality of elongated stripping members with first and second ends;

said first ends being fixedly attached to said machine;

said second ends extending into said proportional spaces unoccupied by said cutters;

whereby said stripping members remove said rubber strips from said cutters and direct said rubber strips out of said machine.

8. A process for pulverizing rectangular rubber strips from used vehicular tires into granulated particulate, said process comprising:

a first step in which said rubber strips are fed through a feed means for feeding rubber strips into an improved grinding machine containing a pair of mating grinding discs with cutting surfaces separated by a 0.015 inch (0.038 cm) controlled gap;

a second step in which said grinding discs rotate in opposite directions while said discs' cutting surfaces separate wires and fibers from said rubber strips and cut said rubber strips multiple times into smaller rubber pieces;

a third step in which said rubber pieces, wires, and polyester fibers are extruded from said grinding machine;

a fourth step in which said extruded rubber pieces are again fed through feed means into said improved grinding machine containing a pair of mating grinding discs with cutting surfaces now separated by a 0.001 inch (0.00254 cm) controlled gap;

a fifth step in which said grinding discs again rotate in opposite directions while said discs' cutting surfaces cut said rubber pieces multiple times into granulated rubber particulate;

a sixth step in which granulated rubber particulate is extruded from said grinding machine.

9. The process of claim 8 in which the improved grinding machine includes a set of grinding discs for a grinding machine for grinding rubber chips, the grinding discs comprising:

a first and a second grinding disc;

each said disc having a first side, a second side, a center, and an outer perimeter;

said first side of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of each said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said third, fourth, fifth, and sixth raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion.

10. A grinding machine for grinding tires, said machine comprising:

a first and a second grinding disc with a maximum speed of 50 revolutions per minute;

each said disc having a first side, a second side, a center, and an outer perimeter;

said first sides of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of each said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said third, fourth, fifth, and sixth raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion.

11. A machine for shredding a tire comprising:

first and second shafts having central axes;

a plurality of cutters proportionally spaced on said first and second shafts and having proportional spaces located between each said cutter;

each of said plurality of cutters having a plurality of cutting teeth including a top land with a cutting portion and a bottom land with a cutting portion;

each cutter of said first shaft opposing the proportional space on said second shaft and each cutter on said second shaft opposing the proportional space on said first shaft;

said shafts rotating on said central axes in opposite directions;

said cutting portions on said top and bottom lands coming into line to line contact with one another as said shafts rotate;

said cutters drawing said tire in between said cutting teeth and said proportional spaces;

said cutting portions cutting said tire into strips as said top land of each cutting tooth of said plurality of cutting teeth of said plurality of cutters on said first shaft traverses across said bottom land of each cutting tooth of said plurality of cutting teeth of said plurality of cutters on said second shaft;

the machine further including a secondary reel-type shredder for cutting said rubber strips into smaller rubber pieces and a set of grinding discs for a grinding machine for grinding rubber chips, the grinding discs including a first and a second grinding disk;

each said disc having a first side, a second side, a center, and an outer perimeter;

said first side of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of each said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said third, fourth, fifth, and sixth raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion.

12. The machine of claim 11 further including a separating means for separating metal wires and polyester fibers from said rubber, said separating means comprising:

a magnetic conveyor for separating said metal wires from said rubber and polyester fibers;

a shaker conveyor with apertures for separating said rubber from said polyester fibers;

a vacuum means for further separating said rubber from said polyester fibers.

13. The machine of claim 12 further including a second set of grinding discs for further granulating said rubber.

14. A process for shredding vehicular tires comprising:

a first step in which said tires are cut into small strips using a shredding machine having a primary shredder with opposing cutters containing a plurality of cutting teeth and a secondary shredder;

a second step in which said strips are further reduced in size using an improved grinding machine having mating grinding discs with respective working surfaces separated by a controlled gap;

a third step in which metal wires and fibers are separated from said rubber granules using a machine comprising:

a magnetic conveyor for separating said metal wires from said rubber and polyester;

a shaker conveyor with apertures for separating said rubber from said polyester fibers;

a vacuum means for further separating said rubber from said polyester fibers;

a fourth step further granulating said rubber granules using:

said improved grinding machine of said second step with said controlled gap between said working surfaces of said grinding discs being reduced to approximately 0.001 inch (0.00254 cm);

the improved grinding machine including a set of grinding discs for a grinding machine for grinding rubber chips, the grinding discs comprising:

a first and a second grinding disc;

each said disc having a first side, a second side, a center, and an outer perimeter;

said first side of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of each said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said third, fourth, fifth, and sixth raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion.

15. A process for shredding vehicular tires comprising:

a first step in which said tires are cut into small strips using a shredding machine having a primary shredder with opposing cutters containing a plurality of cutting teeth and a secondary shredder;

a second step in which said strips are further reduced in size using an improved grinding machine having mating grinding discs with respective working surfaces separated by a controlled gap;

a third step in which metal wires and fibers are separated from said rubber granules using a machine comprising:

a magnetic conveyor for separating said metal wires from said rubber and polyester;

a shaker conveyor with apertures for separating said rubber from said polyester fibers;

a vacuum means for further separating said rubber from said polyester fibers;

a fourth step further granulating said rubber granules using:

said improved grinding machine of said second step with said controlled gap between said working surfaces of said grinding discs being reduced to approximately 0.001 inch (0.00254 cm);

the tire shredder including a machine for shredding tires comprising:

first and second shafts having central axes;

a plurality of cutters proportionally spaced on said first and second shafts and having proportional spaces located between each said cutter;

each of said plurality of cutters having a plurality of cutting teeth including a top land with a cutting portion and a bottom land with a cutting portion;

each cutter of said first shaft opposing the proportional space on said second shaft and each cutter on said second shaft opposing the proportional space on said first shaft;

said shafts rotating on said central axes in opposite directions;

said cutting portions on said top and bottom lands coming into line to line contact with one another as said shafts rotate;

said cutters drawing said tire in between said cutting teeth and said proportional spaces;

said cutting portions cutting said tire into strips as said top land of each cutting tooth of said plurality of cutting teeth of said plurality of cutters on said first shaft traverses across said bottom land of each cutting tooth of said plurality of cutting teeth of said plurality of cutters on said second shaft;

a set of grinding discs for a grinding machine for grinding rubber chips, the set of grinding discs comprising:

a first and a second grinding disc;

each said disc having a first side, a second side, a center, and an outer perimeter;

said first side of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of each said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said (third, fourth, fifth, and sixth) raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion;

a set of stripping fingers comprising:

a plurality of elongated stripping members with first and second ends;

said first ends being fixedly attached to said machine;

said second ends extending into said proportional spaces unoccupied by said cutters;

whereby said stripping members remove said rubber strips from said cutters and direct said rubber strips out of said machine.

16. A process for pulverizing rectangular rubber strips from used vehicular tires into granulated particulate, said process comprising:

a first step in which said rubber strips are fed through a feed means for feeding rubber strips into an improved grinding machine containing a pair of mating grinding discs with cutting surfaces separated by a 0.015 inch (0.038 cm) controlled gap;

a second step in which said grinding discs rotate in opposite directions while said discs' cutting surfaces separate wires and fibers from said rubber strips and cut said rubber strips multiple times into smaller rubber pieces;

a third step in which said rubber pieces, wires, and polyester fibers are extruded from said grinding machine;

a fourth step in which said extruded rubber pieces are again fed through feed means into said improved grinding machine containing a pair of mating grinding discs with cutting surfaces now separated by a 0.001 inch (0.00254 cm) controlled gap;

a fifth step in which said grinding discs again rotate in opposite directions while said discs' cutting surfaces cut said rubber pieces multiple times into granulated rubber particulate;

a sixth step in which granulated rubber particulate is extruded from said grinding machine; the grinding machine including a set of grinding discs for a grinding machine for grinding rubber chips, the grinding discs including a first and a second grinding disc;

each said disc having a first side, a second side, a center, and an outer perimeter;

said first side of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of each said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said third, fourth, fifth, and sixth raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion.

17. A process for shredding vehicular tires comprising:

a first step in which said tires are cut into small strips using a shredding machine having a primary shredder having opposing cutters containing a plurality of cutting teeth and a secondary shredder;

a second step in which said strips are further reduced in size using an improved grinding machine having mating grinding discs, with only outwardly radiating grooves, with respective working surfaces separated by a controlled gap;

a third step in which metal wires and fibers are separated from said rubber granules using a machine comprising:

a magnetic conveyor for separating said metal wires from said rubber and polyester;

a shaper conveyor with apertures for separating said rubber from said polyester fibers;

a vacuum means for further separating said rubber from said polyester fibers;

a fourth step further granulating said rubber granules using:

said improved grinding machine of said second step with said controlled gap between said working surfaces of said grinding discs being reduced to approximate 0.001 inch (0.00254 cm).

18. The process of claim 17 whereby the primary shredder is a machine for shredding a tire comprising:

first and second shafts having central axes;

a plurality of cutters proportionally spaced on said first and second shafts and having proportional spaces located between each said cutter;

each of said plurality of cutters having a plurality of cutting teeth including a top land with a cutting portion and a bottom land with a cutting portion;

each cutter of said first shaft opposing the proportional space on said second shaft and each cutter on said second shaft opposing the proportional space on said first shaft;

said shafts rotating on said central axes in opposite directions;

said cutting portions on said top and bottom lands coming into line to line contact with one another as said shafts rotate;

said cutters drawing said tire in between said cutting teeth and said proportional spaces;

said cutting portions cutting said tire into strips as said top land of each cutting tooth of said plurality of cutting teeth of said plurality of cutters on said first shaft traverses across said bottom land of each cutting tooth of said plurality of cutting teeth of said plurality of cutters on said second shaft.

19. The process of claim 17 in which the improved grinding machine comprises a set of grinding discs for a grinding machine for grinding rubber chips, the grinding discs comprising:

a first and a second grinding disc;

each said disc having a first side, a second side, a center, and an outer perimeter;

said first side of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of each said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said third, fourth, fifth, and sixth raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion.

20. The process of claim 17 in which the primary shredder comprises a machine for shredding a tire comprising:

first and second shafts having central axes;

a plurality of cutters proportionally spaced on said first and second shafts and having proportional spaces located between each said cutter;

each of said plurality of cutters having a plurality of cutting teeth including a top land with a cutting portion and a bottom land with a cutting portion;

each cutter of said first shaft opposing the proportional space on said second shaft and each cutter on said second shaft opposing the proportional space on said first shaft;

said shafts rotating on said central axes in opposite directions;

said cutting portions on said top and bottom lands coming into line to line contact with one another as said shafts rotate;

said cutters drawing said tire in between said cutting teeth and said proportional spaces;

said cutting portions cutting said tire into strips as said top land of each cutting tooth of said plurality of cutting teeth of said plurality of cutters on said first shaft traverses across said bottom land of each cutting tooth of said plurality of cutting teeth of said plurality of cutters on said second shaft;

in combination with stripping fingers including:

a plurality of elongated stripping members with first and second ends;

said first ends being fixedly attached to said machine;

said second ends extending into said proportional spaces unoccupied by said cutters;

whereby said stripping members remove said rubber strips from said cutters and direct said rubber strips out of said machine.

21. The process of claim 17 in which the tire shredder is an apparatus for pulverizing tires comprising:

a machine for shredding tires comprising:

first and second shafts having central axes;

a plurality of cutters proportionally spaced on said first and second shafts and having proportional spaces located between each said cutter;

each of said plurality of cutters having a plurality of cutting teeth including a top land with a cutting portion and a bottom land with a cutting portion;

each cutter of said first shaft opposing the proportional space on said second shaft and each cutter on said second shaft opposing the proportional space on said first shaft;

said shafts rotating on said central axes in opposite directions;

said cutting portions on said top and bottom lands coming into line to line contact with one another as said shafts rotate;

said cutters drawing said tire in between said cutting teeth and said proportional spaces;

said cutting portions cutting said tire into strips as said top land of each cutting tooth of said plurality of cutting teeth of said plurality of cutters on said first shaft traverses across said bottom land of each cutting tooth of said plurality of cutting teeth of said plurality of cutters on said second shaft;

a set of grinding discs for a grinding machine for grinding rubber chips, the set of grinding discs comprising:

a first and a second grinding disc;

each said disc having a first side, a second side, a center, and an outer perimeter;

said first side of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of each said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said (third, fourth, fifth, and sixth) raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion;

a set of stripping fingers comprising:

a plurality of elongated stripping members with first and second ends;

said first ends being fixedly attached to said machine;

said second ends extending into said proportional spaces unoccupied by said cutters;

whereby said stripping members remove said rubber strips from said cutters and direct said rubber strips out of said machine.

22. A machine for shredding a tire comprising:

first and second shafts having central axes;

a plurality of cutters proportionally spaced on said first and second shafts and having proportional spaces located between each said cutter;

each of said plurality of cutters having a plurality of cutting teeth including a top land with a cutting portion and a bottom land with a cutting portion;

each cutter of said first shaft opposing the proportional space on said second shaft and each cutter on said second shaft opposing the proportional space on said first shaft;

said shafts rotating on said central axes in opposite directions;

said cutting portions on said top and bottom lands coming into line to line contact with one another as said shafts rotate;

said cutters drawing said tire in between said cutting teeth and said proportional spaces;

said cutting portions cutting said tire into strips as said top land of each cutting tooth of said plurality of cutting teeth of said plurality of cutters on said first shaft traverses across said bottom land of each cutting tooth of said plurality of cutting teeth of said plurality of cutters on said second shaft;

a secondary reel-type shredder for cutting said rubber strips into smaller rubber pieces;

a set of grinding discs for a grinding machine for grinding the rubber pieces, the grinding discs comprising:

a first and a second grinding disc;

each said disc having a first side, a second side, a center, and an outer perimeter;

said first side of each said disc being a working surface;

said first disc having an aperture generally located in said center;

said working surface of said first disc being parallel to and separated by a controlled gap from said working surface of said second disc;

said working surfaces of said first and second discs having raised portions and lowered portions;

said lowered portions having bottom surfaces;

said bottom surfaces being tapered such that their maximum depth is substantially at said center of each said disc, decreasing in depth toward said outer perimeter of said disc;

each of said working surfaces being divided into a plurality of sections;

each said section having a first, second, third, fourth, fifth, and sixth raised portion;

each said raised portion having a top surface;

each said raised portion extending from said outer perimeter inward;

said first, third, fourth, fifth, and sixth raised portions being generally trapezoidal;

each of said trapezoidal raised portions having two long sides;

said long sides of said third, fourth, fifth, and sixth raised portions being parallel;

said second raised portion being substantially triangular;

said first, third, fourth, and sixth raised portions having a tapered end;

said tapered end of said first raised portion parallel to said long sides of said third, fourth, fifth, and sixth raised portions;

said tapered ends of said third, fourth, and sixth raised portions parallel to said long sides of said first raised portion;

said first raised portion having a point near its tapered end;

said fifth raised portion intersecting said first raised portion at said point;

said sixth raised portion being longer than said fourth raised portion;

said fourth raised portion being longer than said third raised portion.

23. The machine of claim 22 further including a separating means for separating metal wires and polyester fibers from said rubber, said separating means comprising:

a magnetic conveyor for separating said metal wires from said rubber and polyester fibers;

a shaker conveyor with apertures for separating said rubber from said polyester fibers;

a vacuum means for further separating said rubber from said polyester fibers.

24. The machine of claim 23 further including a second set of grinding discs for further granulating said rubber.

* * * * *